United States Patent
Cormier et al.

(10) Patent No.: US 7,254,814 B1
(45) Date of Patent: Aug. 7, 2007

(54) METHODS AND APPARATUS FOR MANAGING PLUG-IN SERVICES

(75) Inventors: Richard Francis Cormier, Franklin, MA (US); Andrew Bruce, Lorton, VA (US); Svetlana Patsenker, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 976 days.

(21) Appl. No.: 09/967,111

(22) Filed: Sep. 28, 2001

(51) Int. Cl.
G06F 9/46 (2006.01)
G06F 9/44 (2006.01)

(52) U.S. Cl. .................. 718/106; 717/120; 717/121

(58) Field of Classification Search ............. 719/328, 719/311; 709/217–219, 201–207, 223; 717/120, 717/121; 707/1–10, 100–104.1, 201–206; 718/100–107
See application file for complete search history.

(56) References Cited

U.S. PATENT DOCUMENTS

| | | | | |
|---|---|---|---|---|
| 5,903,728 A | * | 5/1999 | Semenzato | 709/217 |
| 6,006,279 A | * | 12/1999 | Hayes | 719/328 |
| 6,560,606 B1 | * | 5/2003 | Young | 707/100 |
| 6,704,750 B2 | * | 3/2004 | Asazu | 707/104.1 |
| 6,742,176 B1 | * | 5/2004 | Million et al. | 717/120 |
| 6,782,531 B2 | * | 8/2004 | Young | 717/130 |
| 6,842,856 B2 | * | 1/2005 | Shenassa et al. | 713/1 |

* cited by examiner

*Primary Examiner*—William Thomson
*Assistant Examiner*—Charles Anya
(74) *Attorney, Agent, or Firm*—Chapin IP Law, LLC; Barry W. Chapin, Esq.

(57) ABSTRACT

Methods and apparatus operate in a computer system to manage initiation and operation of plug-in modules providing plug-in services. The plug-in manager obtains identities of a plurality of plug-in modules and retrieves a dependency list indicating respective plug-in services provided by, and required by, each plug-in module identified in the identities of the plug-in modules. The plug-in manager then calculates a plug-in initiation order based upon the dependency list indicating respective plug-in services provided by, and required by, each plug-in module. The plug-in manager then initiates service operation of plug-in modules according to the plug-in initiation order, such that if a first plug-in module provides a service required by a second plug-in module, the first plug-in module is initiated such that the service provided by the first plug-in module is available to the second plug-in module when required by the second plug-in module. In addition, the plug-in manager can operate a wait state operation within plug-in modules that provide services that depend upon each other in order to avoid service deadlocked situations.

46 Claims, 7 Drawing Sheets

METHODS AND APPARATUS FOR MANAGING PLUG-IN SERVICES

FIELD OF THE INVENTION

The present invention generally relates to computer and software environments that require the use of services, and more particularly, to systems and techniques that manage plug-in services on behalf of software applications and processes requiring access to plug-in services.

BACKGROUND OF THE INVENTION

Many types of conventional computing systems operate software programs that require services of various types during their operation. By way of example, a software application such as an Internet web browser which operates (e.g., executes) as a web browser process within a computer system may require audio and/or video playback services, document rendering services, document interpretation services or other services for which service logic (i.e., software code or instructions that provide such services) is not built-in to the web browser application itself. The reason that developers of software applications do not often provide all required service logic for every service within the application code is because service software developers are constantly developing new services that applications may require access to for various purposes. In addition, service capabilities can change when service developers update service logic to accommodate new features or revisions. For these reasons, many conventional software applications access services by incorporating the use of software modules called "plug-ins."

Generally, a conventional plug-in module is a software procedure, library routine, function, or other entity which a service developer creates to operate in a computer system in order to provide required processing functionality for a particular purpose. The purpose of the plug-in module is referred to as the "service" provided by the plug-in module. A typical plug-in module incorporates the use of a standardized application programming interface (API) that allows other software applications, such as the web browser process mentioned above, to access the service provided by the plug-in module by making a function or system call to the service using the plug-in application programming interface. In operation, the application programming interface for a plug-in module offering a service receives a set of input variable values which the service logic and processing within the plug-in module can operate upon in order to provide the service offered by the plug-in module. The application programming interface can also return or output a result that reflects the performance of the service logic upon the input variable values. A plug-in module may direct the output, for example, to a specific output device such as the computer display or an audio or video output device.

In some instances, a conventional software application might attempt to access or process data that requires a service provided by a plug-in module that is not presently resident within the computer system in which the software application is operating. As an example, consider a situation in which a user directs a web browser to access video data that is arranged in a video format that requires the services of a video plug-in module in order for that web browser to playback the video to the user operating the web browser. Unless the web browser has previously accessed video data in this particular video format, it is unlikely that the plug-in module providing the video playback service is resident on the computer system in which the web browser is operating. The web browser process may automatically make this determination since the video data may specify what plug-in service is required to playback the video data. The web browser can check a list of currently available plug-in services to determine if the required service is available from a resident plug-in. If the web browser process determines that the required plug-in service is not resident on the computer system, the web browser may prompt the user to obtain the required plug-in module that provides the required plug-in service, for example, via downloading the plug-in module from a plug-in developer web site. If the user instructs the web browser to download the plug-in module, the web browser can proceed to obtain (via a download process), install and operate (i.e., run, interpret or otherwise perform or access) the required plug-in module in order to obtain and use the video playback service that the plug-in module provides.

SUMMARY OF THE INVENTION

Conventional techniques for accessing plug-in modules and plug-in services suffer from a number of deficiencies. By way of example, if a particular plug-in module provides a plug-in service that operates using a proprietary application programming interface, a software application that desires to use that plug-in service must contain logic instructions and/or function calls which conform or adhere to the proprietary application programming interface requirements. As a specific example, if a conventional plug-in module provides a proprietary naming service, applications that desire to use that naming service must include service calls to the plug-in module that conform to the proprietary naming service application programming interface. Once a software developer creates a software application that contains plug-in service calls that conform to the proprietary format, if the user of the software application later decides to replace the naming service with a new naming service provided by a plug-in module created by a new software developer, the plug-in service calls within the software application that conform to the old proprietary format will no longer be usable with the new plug-in service. As a result, the developer of the software application must make modifications to the plug-in service calls in the application to conform to the new format required by the new naming service plug-in.

Another drawback that is present in conventional techniques and mechanisms for managing plug-in services relates to difficulty in determining when a plug-in service is properly available for use by a particular software application. As an example, in a complex computing system environment, it may be the case that one plug-in service relies on the use of another plug-in service for certain operational capabilities. This is called a plug-in or service "dependency." It may be the case, for example, that a video playback plug-in service also requires the use of an audio playback plug-in service in order for audio data, which is encoded within the video data, to be reproduced to the speakers of a computer system while the video playback plug-in service reproduces the video data on the computer display. Using this example, it may be said that the video playback plug-in module which provides the video playback plug-in service is dependent upon or requires the audio playback plug-in module that provides the audio playback plug-in service.

Continuing with this example, when a conventional software application requires the ability to playback video data (which includes playback of audio data), the software application might recognize that a required video playback plug-in module is not resident within the computer system in which the conventional software application operates. As discussed above, the conventional software application allows a user to direct the application to download the required video playback plug-in module. However, the conventional software application may be unaware that the video playback plug-in module also requires the use of an audio playback plug-in module that may not be resident within the computer system in which the conventional software application operates. As a result, upon operation of only the video playback plug-in service, the video data is either reproduced without sound, or the video playback plug-in service may be unable to playback the video at all due to an inability to operate without the use of the audio playback plug-in service.

Embodiments of the present invention significantly overcome these and other deficiencies found in conventional plug-in management and plug-in service operation environments. In particular, embodiments of the invention provide a plug-in manager application and process that operates in a computer system to manage services associated with a plurality of plug-in modules. The plug-in manager process can operate on behalf of software applications requiring access to plug-in services by receiving, detecting or otherwise determining a list of plug-in services that the software application requires. The plug-in manager can then query a set of plug-in modules identified in the list in order to determine service dependencies between the plug-in modules. For example, if a software application indicates that three plug-in services are required during operation of that software application, the plug-in manager process can operate the plug-in modules in an initiation or enabled mode and can query those plug-in modules for a list of services that they provide and for a list services that they will require when operating in a service operation mode. Using this information, if necessary the plug-in manager can also query other plug-in modules which were not identified by the software application, but which supply or provide the services that are required by the plug-in modules that the software application did identify. This process can continue until the plug-in manager discovers and queries all plug-in modules.

Once the plug-in manager obtains the dependencies of all plug-in modules, the plug-in manager can calculate a plug-in initiation sequence or order based upon the dependencies identified between the plug-in modules. This may be done, for example, by analyzing the plug-in module dependencies to produce a dependency tree that contains nodes that represent plug-in modules and whose hierarchy represents a plug-in module initiation order. For example, the lowest or leaf notes in the plug-in module dependency tree identify services of plug-in modules that should be initiated or started first whereas upper-level nodes in the tree identify plug-in modules that provide services that should be initiated after their child nodes in the dependency tree.

Using the calculated plug-in initiation order, the plug-in manager can initiate service operation of the plug-in modules according to the plug-in initiation order. As a result, if a first plug-in module provides a service required by a second plug-in module, the first plug-in module will be initiated such that the service provided by the first plug-in module is available to the second plug-in module when required by the second plug-in module. That can result, for example, in plug-in modules that provide services that other plug-in modules rely upon being started prior to the plug-in modules that require those services. In this manner, embodiments of the invention help to insure that plug-in modules are initiated in a proper sequence so that all services required by plug-in modules will be available when the plug-in modules requiring those services are initiated.

In some instances, if two plug-in modules rely on the services of each other, the initiation order may be to start the services of the plug-in modules concurrently or, one before the other. In such a situation, one plug-in module can include a wait state operation that the plug-in manager can operate to cause the plug-in module to wait to provide its service until the other plug-in module begins providing service. Alternatively, the wait state operation can cause one plug-in module to signal to the other plug-in module (the other one that is dependent upon the one providing the signal) to indicate that a service is not available. This allows two plug-in modules that depend upon each other to signal to each other to allow one to start followed by the other in an order which the plug-in modules can determine to avoid a deadlock in the plug-in module service initiation order.

In addition, certain embodiments of the invention operate using Java or other object-oriented interfaces within the computer system environment for communication between the plug-in manager and the plug-in modules. Using such interfaces avoids having to incorporate different proprietary code for multiple interfaces to different proprietary plug-in modules.

Generally, one method embodiment of the invention operates to manage plug-in services by obtaining identities of a plurality of plug-in modules and retrieving a dependency list indicating respective plug-in services provided by, and required by, each plug-in module identified in the identities of a plurality of plug-in modules. As noted above, a plug-in manager of performing this method is a thus able to determine what services are provided and required by all plug-in modules. Thereafter, the method calculates a plug-in initiation order based upon the dependency list indicating respective plug-in services provided by, and required by, each plug-in module. The method then initiates service operation of plug-in modules according to the plug-in initiation order, such that if a first plug-in module provides a service required by a second plug-in module, the first plug-in module is initiated such that the service provided by the first plug-in module is available to the second plug-in module when required by the second plug-in module.

Other embodiments of the invention include a computerized device, such as a workstation, computer system or other such device configured to process all of the method operations disclosed herein as embodiments of the invention. In such embodiments, the computer system includes an interface, a memory, a processor and an interconnection mechanism connecting the interface, the processor and the memory. The memory is encoded with a plug-in manager application that when performed on the processor, produces a plug-in manager process that manages services associated with a plurality of plug-in modules by causing the computer system to perform any or all of the method embodiments and operations explained herein as embodiments of the invention. In other words, a computer system or computerized device programmed or configured to operate according to the method operations explained herein is considered an embodiment of the invention.

Other arrangements of embodiments of the invention that are disclosed herein include software programs to perform the method embodiment operations summarized above and disclosed in detail below. More particularly, a computer program product is disclosed which has a computer-readable medium including computer program logic encoded to provide management of plug-in services and plug-in modules as explained herein. The computer program logic, when executed on at least one processor within a computer system, causes the processor to perform the operations (e.g., the methods) indicated herein as embodiments of the invention. Such arrangements of the invention are typically implemented as software, code and/or other data arranged or encoded on any type of computer readable medium such as a magnetic or optical medium (e.g., CD-ROM), floppy or hard disk, or other a storage medium such as a memory or memory system, firmware or microcode in one or more Read Only Memory (ROM) or Random Access Memory (RAM) chips or other microchips or as an Application Specific Integrated Circuit (ASIC) or any equivalents thereof. The software, firmware or other such computer readable medium configuration can be installed and operated within a computer system to cause the computer system to perform the techniques explained herein as embodiments of the invention. It is to be understood however that such embodiments may comprise the computer readable medium encoded with the data and instructions to carry out the processing of the method embodiments explained herein, and that the computer readable medium does not need to be installed, coupled or otherwise configured (i.e., loaded and read) within a computer system that can read the computer readable medium. The encoded medium alone is thus an embodiment.

It is also to be understood that the system of the invention can be embodied strictly as a software program, as software and hardware, or as hardware alone (e.g., via implementation in circuitry). Example embodiments of the invention may be implemented within the software applications that provide and manage plug-in functionality in a storage area network (SAN) computing system environment such as the EMC Control Center Software application manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS OF THE INVENTION

Figure 1:
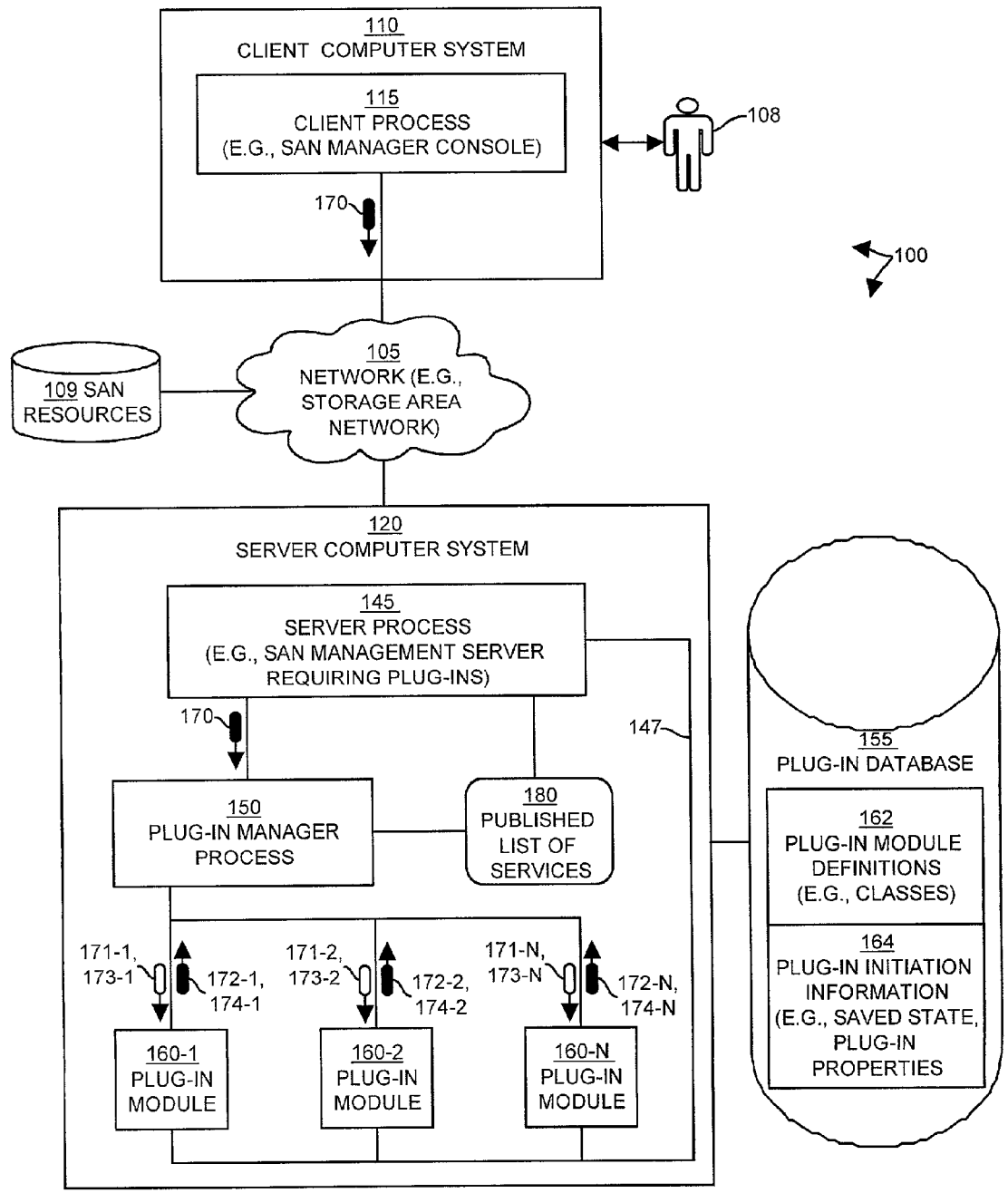
FIG. 1 illustrates an example of a computing system environment including a computer system operating a plug-in manager process configured according to one embodiment of the invention.

Generally, embodiments of the invention provide unique mechanisms and techniques that operate to provide a plug-in manager that manages plug-in services and plug-in module service invocation (e.g., startup and shutdown) on behalf of software applications requiring access to the plug-in services. As an example, when a software application such as a client or server process requires access to one or more plug-in modules for use of particular plug-in services offered by those plug-in modules, a plug-in manager configured according to embodiments of the invention is able to obtain the identity of the plug-in modules for which access is requested. The plug-in manager can then instantiate each plug-in module into an enabled state and can query a dependency interface associated with each plug-in module in order to determine plug-in dependencies associated with that plug-in module. In response to a dependency query, a plug-in module can provide, to the plug-in manager, a list of services provided by that plug-in module as well as a list of services required by that plug-in module. By querying all plug-in modules identified by a software application (and any plug-in modules which those plug-in modules require), the plug-in manager can determine all services that are required by or provided by the complete set of plug-in modules that will need to operate to provide the required services requested by the application.

Using this information, the plug-in manager configured according to embodiments of the invention can further operate to calculate a plug-in startup or initiation order that is used to initiate plug-in modules into a started state during which those plug-in modules provide their respective services. The plug-in manager can then initiate service operation of the plug-in modules according to the initiation order. As a result of initiating plug-in modules according to the calculated initiation order, the plug-in manager can help to ensure that plug-in modules that require services offered by other plug-in modules are not prematurely started. In addition, if two or more plug-in modules require the services of each other for proper operation (e.g., they are interdependent upon each other), the plug-in manager can initiate each plug-in module at the same approximate time (or one before the other) and each interdependent plug-in module can operate a wait-state operation which allows them to signal between each other at an appropriate time to begin service operation to avoid service deadlocks.

A plug-in manager configured according to embodiments of the invention can also operate to publish a list of services available for the current set of plug-in modules which are operating in a started state (i.e., that can provide services). This published list of services is accessible by software applications that require plug-in services thus allowing the applications to quickly identify and access plug-in module services which they may require during their operation.

FIG. 1 illustrates an example of a computing system environment 100 suitable for use in explaining example operations of embodiments of the invention. The computing system environment 100 includes a network 105 which may be any type of data or communications network arranged in a local area network (LAN), wide area network (LAN), Internet or storage area network (SAN) configuration (as in this example) or any combination thereof. The network 105 couples storage area network resources 109, a client computer system 110 and a server computer system 120. The network 105 allows communications to take place between the storage area network resources 109 and the client and server computer systems 110 and 120. The client and server computer systems 110 and 120 can be any type of computing system such as a workstation, personal computer, mainframe, portable computing device or the like. The server computer system 120 in this example includes a coupling to a plug-in database 155 that contains plug-in module definitions 162 and plug-in initiation information 164.

The client computer system 110 operates a client process 115 that, in this example, is a storage area network (SAN) manager console process that allows a user 108 to manage storage area network resources 109 operating within the storage area network 105. The storage area network resources 109 can be any type of manageable hardware or software entities such as data storage systems, storage area network data communication devices (e.g., SAN switches), and/or storage area network software applications operating in such devices. The client process 115 intercommunicates over the network 105 with a server process 145 operating within the server computer system 120. In this example, the server process 145 is a storage area network management server. The client process 115 accesses (e.g., exchanges commands with) the server process 145 in order to obtain management data concerning the storage area network resources 109 and to direct the server process 145 to carry out storage area network management operations (i.e., management commands) upon the storage area network resources 109. During such processing, either the client process 115 and/or the server process 145 may require the use of plug-in services provided by plug-in modules 160-1 through 160-N operating within the server computer system 120.

Besides operating the server process 145, in this example, the server computer system 120 further operates (i.e., executes, runs, interprets or otherwise performs) other software processes including a plug-in manager process 150 configured according to embodiments of the invention and one or more (a plurality in this example) plug-in modules 160-1 through 160-N. Each plug-in module 160 can operate to provide one or more services 147 to software applications such as the client 115 and/or server processes 145 that require such services (or to other entities such as hardware devices that may require services 147). The processing and service logic of each plug-in module 160 is defined within the plug-in module definitions 162 which may be, for example, Java or other object-oriented classes that may be instantiated (as will be explained) to operate as the plug-in modules 160 within the server computer system 120.

In this example, the plug-in manager process 150 operates according to embodiments of the invention to "manage" the plug-in modules 160. Generally, what is meant by the term "manage" is that the plug-in manager process 150 can invoke or instantiate operation plug-in module definitions 162 as plug-in modules 160, and can control the state of the plug-in modules 160, including when they are instantiated into an initiation or enabled state during which time they are performing (e.g., executing or are being interpreted) but do not provide services, and when they are transitioned from the enabled state to a started state during which time they provide their respective services 147. The plug-in manager process 150 can also manage the plug-in modules 160 to transition them from the started or service-providing state back to the enabled state and can, if required, terminate operation of the plug-in modules 160. In addition to managing their run-time operational state, the plug-in manager process 150 can manage the order in which plug-in modules are initiated and terminated in relation to each other such that plug-in module dependencies are not violated. The plug-in manager process 150 can also create and maintain a published list of services 180 indicating which plug-in modules 160 are currently operating and available to provide which respective services 147.

Figure 2:
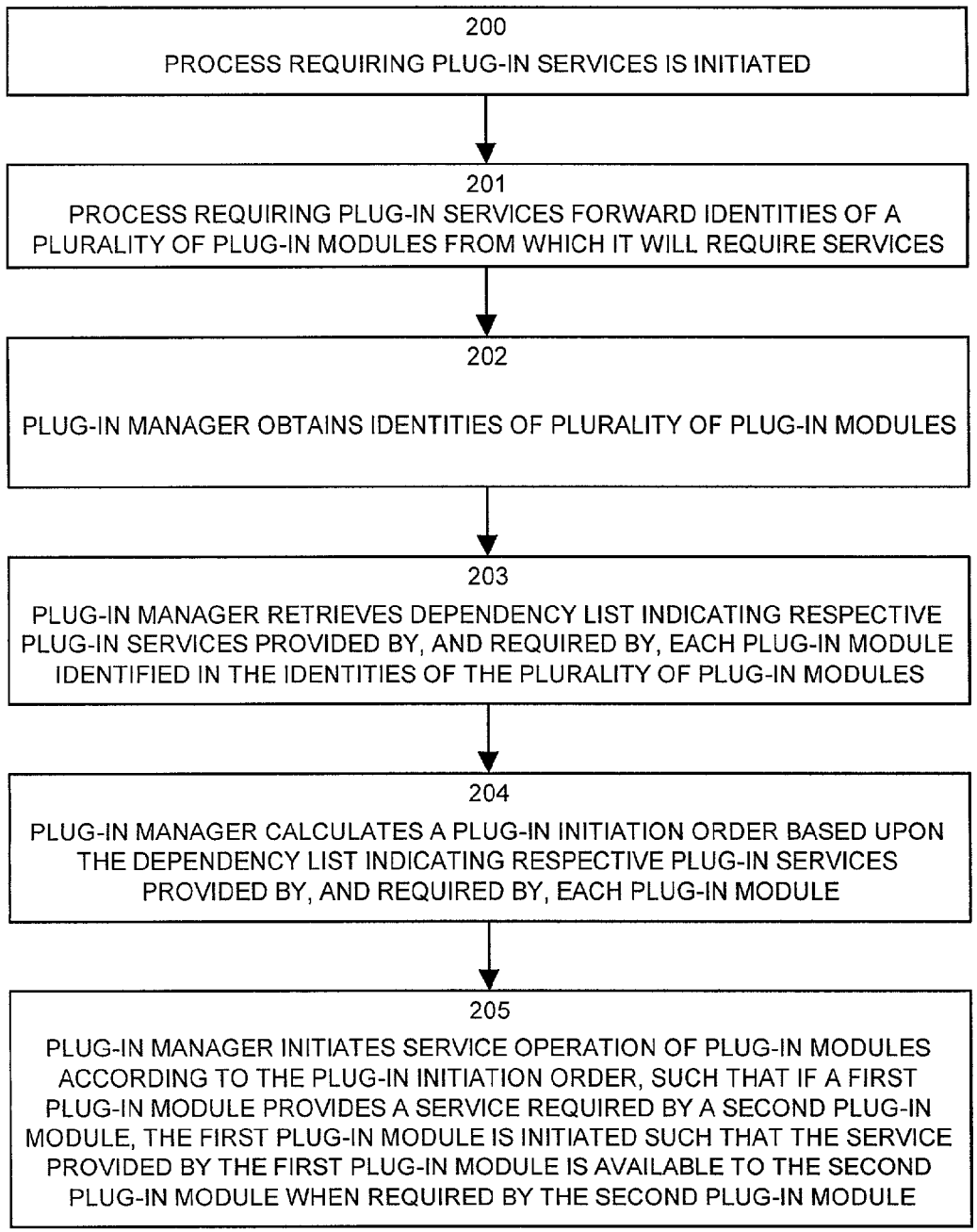
FIG. 2 is a flow chart of processing steps as performed by embodiments of the invention to manage initiation of plug-in services in a computing system environment.

FIG. 2 is a flow chart of processing steps which the server computer system 120 configured to operate the plug-in manager process 150 performs in accordance with one embodiment of the invention. The processing steps in FIG. 2 will be explained with reference to the example computing system environment 100 illustrated in FIG. 1 in order to provide an example of the general operation of embodiments of the invention.

In step 200, a process requiring plug-in services 147 is initiated. Such a process may be a hardware or software entity operating anywhere within the computing system environment 100. With respect to the example in FIG. 1, the client process 115 and the server process 145 interoperate under the control of the user 108 to provide management functionality of storage area network resources 109. During this processing, the client process 115 and/or server process 145 may require access to service functionality provided one or more of the plug-in modules 160. In this particular example, the server process 145 determines that it requires access to plug-in services 147.

Next, in step 201, the process requiring plug-in services (i.e., the server process 145 in the example of FIG. 1) provides a request containing a list of services 170 (i.e., plug-in services that are required) to the plug-in manager process 150. The list of services 170 contains the identity of one or more specific plug-in services 147. The server process 145 (or the client process 115) may forward the list of plug-in services 170 in a service request or system call to an operating system performing within the server computer system 120. The plug-in manager process 150 may operate in conjunction with such an operating system in order to intercept or otherwise retrieve the list of plug-in services 170.

In step 202, the plug-in manager 150 obtains the identities of a plurality of plug-in modules 160 based upon the plug-in services identified in the list of services 170. As an example, the names of the particular plug-in services may correspond to the identity of plug-in module definitions 162 defined within the plug-in database 155.

In step 203, the plug-in manager retrieves a dependency list indicating respective plug-in services provided by, and required by, each plug-in module 160 identified in the identities of the plurality of plug-in modules (obtained in step 202). To perform step 203, the plug-in manager process 150 can access the plug-in module definitions 162 (e.g., Java classes) to instantiate respective plug-in modules 160 corresponding to the services identified in the request 170. The plug-in modules 160 are instantiated into an enabled state in which each plug-in module 160 is resident in memory within the server computer system 120 but is not yet providing its respective service 147. Once each plug-in module 160 is operating in the enabled state, the plug-in manager 150 can provide a dependency query 171 to each plug-in module 160 to determine what services that plug-in module 160 provides and to also determine what services that plug-in module 160 may require to properly operate. In response to such a query, each plug-in module 160 can provide a dependency response 172 back to the plug-in manager process 150 indicating services provided and services required. The collective set of services provided by and required for each respective plug-in module 160 comprises a dependency list compiled, retrieved or otherwise developed by the plug-in manager process 150.

Next, in step 204, the plug-in manager process 150 calculates a plug-in initiation order based upon the dependency list that indicates the respective plug-in services 147 provided by and required by each plug-in module 160. In other words, in step 204, the plug-in manager process 150 figures out an order in which plug-in modules 160 must be transitioned from the enabled state into a started state in which they can provide their respective services, such that plug-in modules that depend upon or require the services 147 of other plug-in modules are started after the plug-in modules 160 providing those required services.

Next, in step 205, the plug-in manager process 150 initiates service operation of plug-in modules 160 according to the plug-in initiation order calculated according to the processing performed in step 204. The plug-in manager process 150 initiates the service operation 147 of the plug-in modules 160 in step 205 such that if a first plug-in module, such as plug-in module 160-1, provides a service (e.g., 147-1, not specifically labeled) that is required by a second plug-in module 160-2, the first plug-in module 160-1 is initiated such that the service 147-1 is available to the second plug-in module 160-2 when required by the second plug-in module 160-2. Generally, in such a case, the first plug-in module 161 is initiated into the started or "service operation" state before the second plug-in module 160-2. The plug-in manager 150 can initiate service operation in a plug-in module 160 by sending a "dependency available" message 173 to that plug-in module 160. The dependency available message 173 indicates the services that are now available for use by that particular plug-in module 160. These may be, for example, the services that that particular plug-in module 160 requires to properly operate.

The dependency available message 173 thus serves as a "go-ahead" message indicating to the plug-in module 160 that a set of services are now available for use by the plug-in module 160. In response to receiving a dependency available message 173, a plug-in module 160 begins to provide a service 147 and replies to the plug-in manager process 150 with a "services available" message 174 which indicates what services 147 that plug-in module 160 is currently able to provide. Generally, the services available message 174 identifies the services that the plug-in module 160 indicated that it could provide in the dependency response message 172. However, in situations where to plug-in modules 160 depend upon each other, it may be the case that the services available message 174 indicates only a subset of all services that the plug-in module 160 is capable of providing and that at a later time, the plug-in module 160 will provide another services available message 174 back to the plug-in manager process 150 to indicate that additional services are now also available.

In this manner, the plug-in manager process 150 configured according to embodiments of the invention helps to ensure that plug-in modules 160 begin providing services 147 in an order which avoids a service deadlock situation in which one plug-in 160 cannot properly operate since a service it requires is not available.

Before explaining additional operations of embodiments of the invention, further details of the architecture and inter-operation between the plug-in manager process 150 and plug-in modules 160 will be explained.

Figure 3:
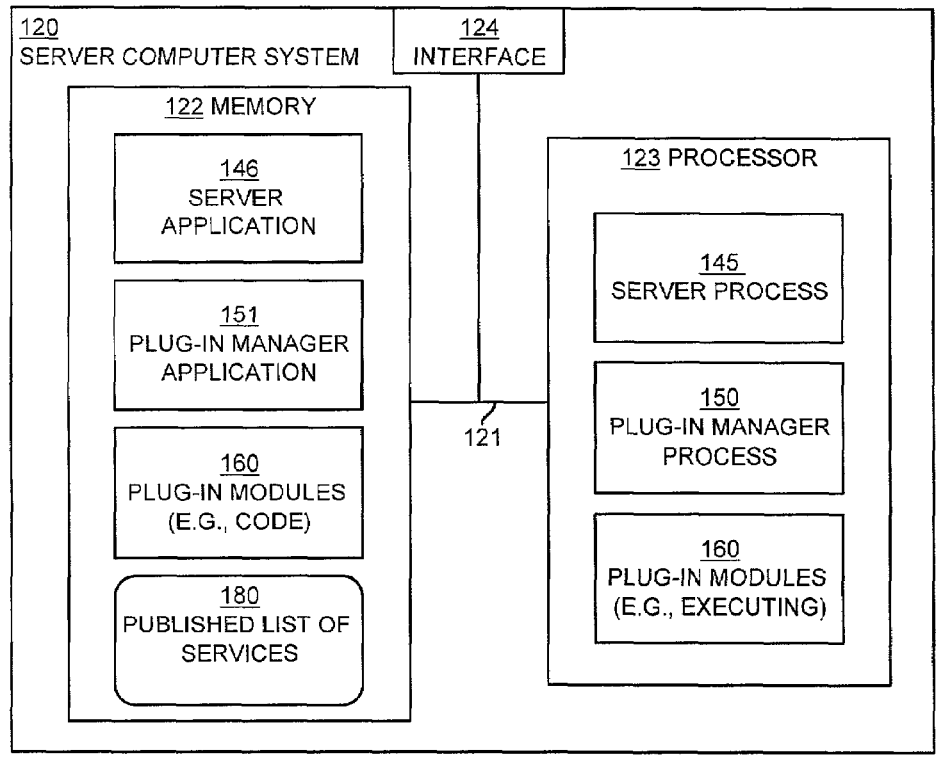
FIG. 3 illustrates an example architecture of the computer system operating a plug-in manager application and process configured according to one embodiment of the invention.

FIG. 3 illustrates an example architecture of a server computer system 120 configured in accordance with one embodiment of the invention. The server computer system 120 can be any type of computerized device such as a personal or portable computer (e.g., laptop, handheld computing device or desktop PC), workstation, minicomputer, mainframe or the like. The server computer system 120 includes an interconnection mechanism 121 that couples a memory 122, a processor 123, and an interface 124. The memory 122 can be any type of computer readable medium such as a semiconductor memory (random access or read only), or may be a volatile memory or a storage medium such as a disk, tape or other medium.

In this example, the memory 122 is encoded with a server application 146, a plug-in manager application 151, one or more plug-in modules 160 and a published list of services 180 that represent data and/or logic instructions (e.g., software code or data in memory) that embody the data structures and processing functionality associated with embodiments of the invention. The processor 123 can access the memory 122 via the interconnection mechanism 121 in order to run, execute, operate, interpret or otherwise access and/or perform the data and logic instructions of the server application 146, the plug-in manager application 151 and plug-in modules 160 to produce a respective server process 145, plug-in manager process 150 and executing (or interpreted) plug-in modules 160. For example, the plug-in manager process 150 represents the operation or execution of one or more portions of the plug-in manager application 151 by the processor 122 in the server computer system 120.

The published list of services 180 within the memory 122 represents a data structure, database or other encoding of data that contains the identity of services 147 and/or plug-in modules 160 that are presently operating in the service operation state to provide services 147 to process such as the server process 145.

Is to be understood that embodiments of the invention include the plug-in manager application 151 (i.e., the un-executed or non-performing logic instructions and/or data) encoded or residing within any type of computer readable medium such as a floppy disk, hard disk or optical medium, or in a memory system such as in firmware, read only memory (ROM), or, as in this example, as executable code within the memory system 122 (e.g., within random access memory or RAM). It is also to be understood that other embodiments of the invention comprise the plug-in manager process 150 operating or performing within the processor 123 in the server computer system 120. While not shown in this example, those skilled in the art will understand that the computer system 120 may include other processes and/or software and hardware components, such as an operating system, which have been omitted from this illustration for ease of description of the invention.

Figure 4:
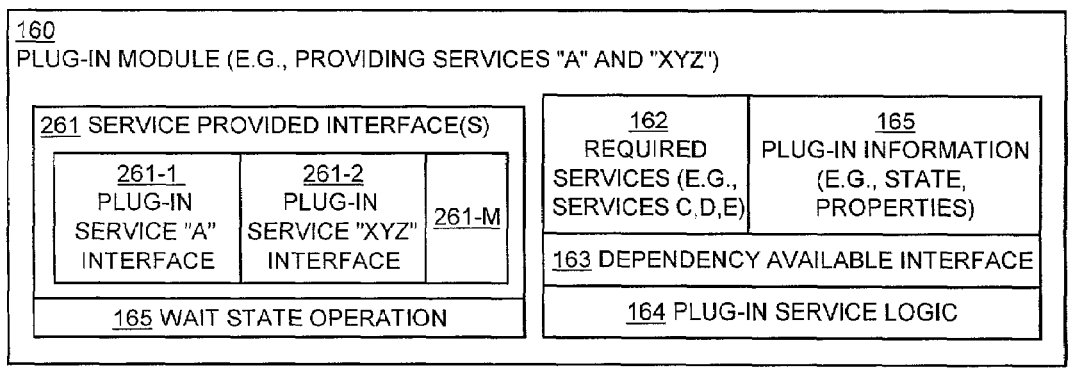
FIG. 4 illustrates a software and interface architecture for a plug-in module configured in accordance with one embodiment of the invention.

FIG. 4 illustrates an example of a software architecture for a plug-in module 160 configured according to one embodiment of the invention. The plug-in module 160 includes a set of "service provided" interfaces 261 (or just service interfaces 261) which in this example include plug-in service "A" interface 261-1, plug-in service "XYZ" interface 261-2 and any other plug-in service interfaces 261-M. There may be one or more of such service interfaces 261 for each plug-in module 160. Each plug-in service interface 261 represents a service 147 that the plug-in module 160 can provide. In this example then, the plug-in module 160 illustrated in FIG. 4 provides the two services (generally, services shown by 147 in FIG. 1) named "A" and "XYZ."

The example plug-in module 160 in FIG. 4 further includes a list of required services 162, which in this example include services "C," "D" and "E". The list of required services 162 indicates which services this particular plug-in module 160 requires during its operation in order to properly provide its own services "A" and "XYZ" defined by the services provided interfaces 261. In other words, the list of required services 162 indicates what services this plug-in module 160 relies upon to properly perform its operation.

The plug-in module 160 further includes plug-in information 165 which can include, for example, plug-in state information and plug-in property information related to the operation of the plug-in module 160. Also included are a dependency available interface 163. The dependency available interface 163 is an interface which the plug-in manager process 150 can use to transition the plug-in module 160 from an enable state to a started or service operation state which allows the plug-in module 160 to provide its services 147. The actual service processing provided by a plug-in module 160 is contained in the plug-in service logic 164 which represents any code, logic instructions and/or data that the plug-in module 160 uses during its operation to provide the services 147 defined by the various service interfaces 261.

In addition, in this example plug-in module 160, a wait state operation 165 is included which represents processing and logic instructions required to allow this plug-in module 160 to determine if other plug-in modules upon which it depends for operation are available for service access. In other words, a wait state operation 165 represents the processing functionality to allow this plug-in module 161 to signal another plug-in module that it is available for service processing or that it is waiting for that other plug-in module to provide a particular required service. As will be explained further, the wait state operation 165 is the useful in situations where the plug-in manager process 150 detects an interdependency between two plug-in modules 160. If the plug-in manager process 150 determines that two plug-in modules depend upon each other for services 147, the plug-in manager process 150 can cause each plug-in module to enter the started or service providing state and can then invoke the wait state operation 165 within one or more of these interdependent plug-in modules 160 to allow those plug-in modules to intercommunicate with each other to indicate when each is available to begin providing a service upon which the other plug-in modules depend. In other words, the wait-state operation interface 165 allows the plug-in manage to pass-off the duties of coordinating a smooth (i.e., non-deadlocked) service start-up procedure between two or more plug-in modules that depend upon each other to those plug-in modules 160.

Figure 5:
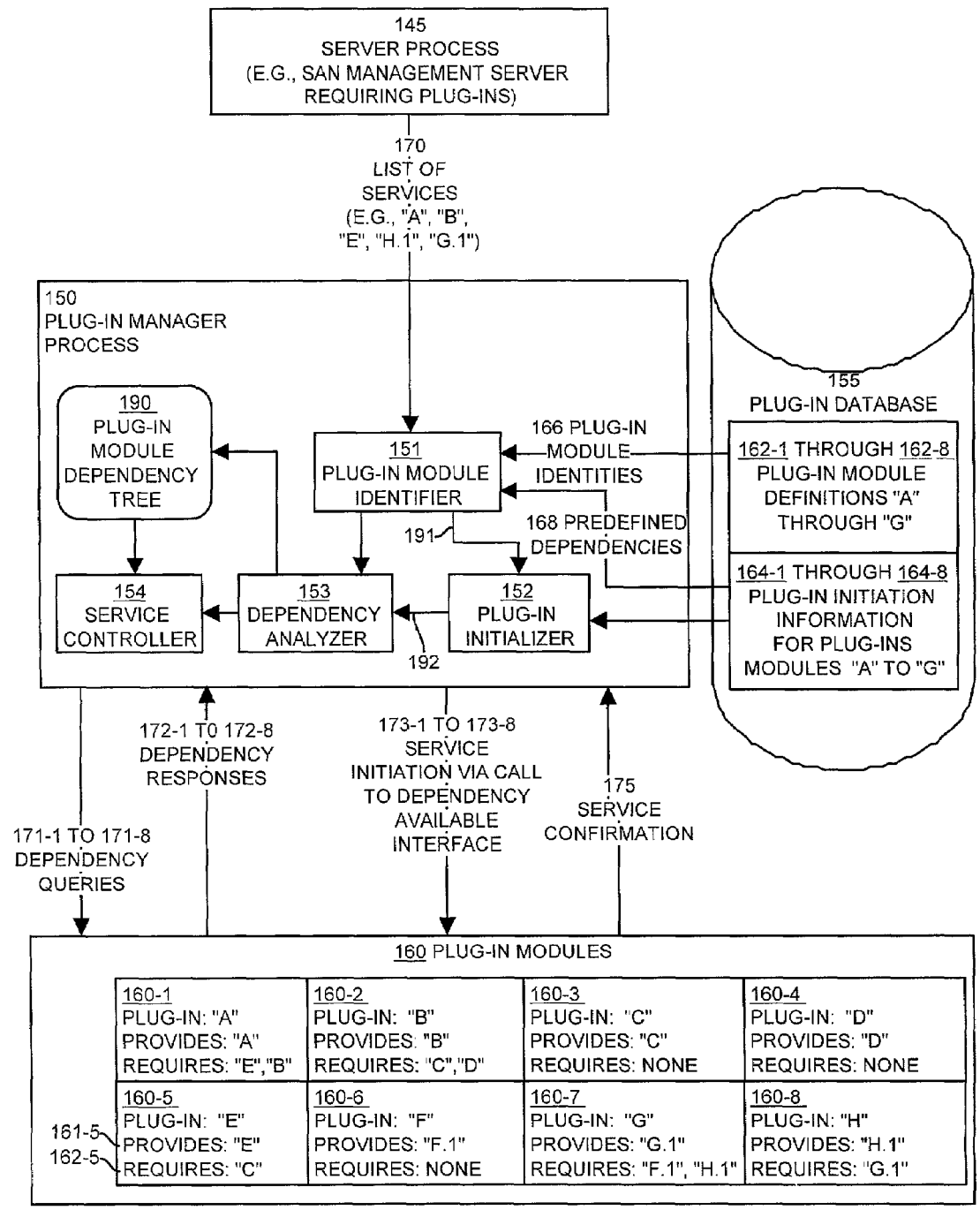
FIG. 5 illustrates a software architecture of a plug-in manager process and communications that can take place between the plug-in manager process and a server process and a plurality of plug-in modules in accordance with one example embodiment of the invention.

FIG. 5 illustrates an example software architecture of a plug-in manager process 150 configured according to one embodiment of the invention. In addition, FIG. 5 illustrates an example of communications that can take place between the plug-in manager process 150 and a server process 145 and a plurality of plug-in modules 160 in accordance with an example operation of one embodiment of the invention.

The example plug-in manager process 150 illustrated in FIG. 5 includes a plug-in module identifier 151, a plug-in initializer 152, a dependency analyzer 153 and a service controller 154. In addition, the plug-in manager process 150, in this example, creates and maintains a plug-in module dependency tree 190 which serves as the plug-in initiation order as will be explained in detail below.

A plurality of plug-in modules 160-1 through 160-8 are also illustrated in FIG. 5. Each plug-in module 160 is software code, logic instructions or other data or information maintained in a respective plug-in module definition 162-1 through 162-8 within the plug-in database 155 that, when instantiated in memory 121 and performed on the processor 122 (FIG. 3) provides a service 147 for one or more requesting processes (e.g., client process 115 and/or server process 145). In the illustration in FIG. 5, each plug-in module 160-1 through 160-8 has a respective plug-in name "A" through "G" which corresponds to the plug-in service which that plug-in module provides. As a specific example, the plug-in module 165 is named plug-in "E" and provides a service named "E" as indicated at location 161-5. In addition, each plug-in module 160 specifies any services required (i.e., depends on) for that plug-in module to properly operate. Again with respect to the example plug-in module 165, the plug-in service "E" requires or depends upon the service "C" to properly operate, as indicated at location 162-5. Some plug-in modules 160 require no other services to properly operate, such as plug-in modules 163 (service "C"), plug-in module 164 (service "D") and plug-in module 166 (service "F") in this example.

Directing attention now specifically to plug-in modules 160-6 through 160-8 (services "F", "G" and "H"), these plug-in modules provide services that include a version identification associated with the services. Specifically, these plug-in modules provide services "F.1", "G.1" and "H.1," where the "0.1" portion of the service name indicates the version of the service that these respective particular plug-in modules 160 provide. In addition, certain plug-in modules 160 may require not only a specific service to properly operate, but may also require a particular version of the service. As an example, plug-in module 160-7 requires the services "F.1" and "H.1". As such, if for example the plug-in module 160-8 providing the "H" service provided a service other than version "H.1" (e.g., H.3), then the plug-in module 160-8 might not provide an "H" service suitable for use by the plug-in module 160-7. Service version identification is optional.

Directing attention now in FIG. 5 and specifically to the communications 170 through 177 which transpire between the plug-in manager process 150, the server process 145 and the plug-in modules 160, each communication message 170 through 177 represents a packet, command, message or other unit of data that conveys information during operation of embodiments of the invention. An example of the operation of the plug-in manager process 150 illustrated in FIG. 5 will now be explained with respect to the flow chart of processing steps shown in FIGS. 6 through 7.

Figure 6:
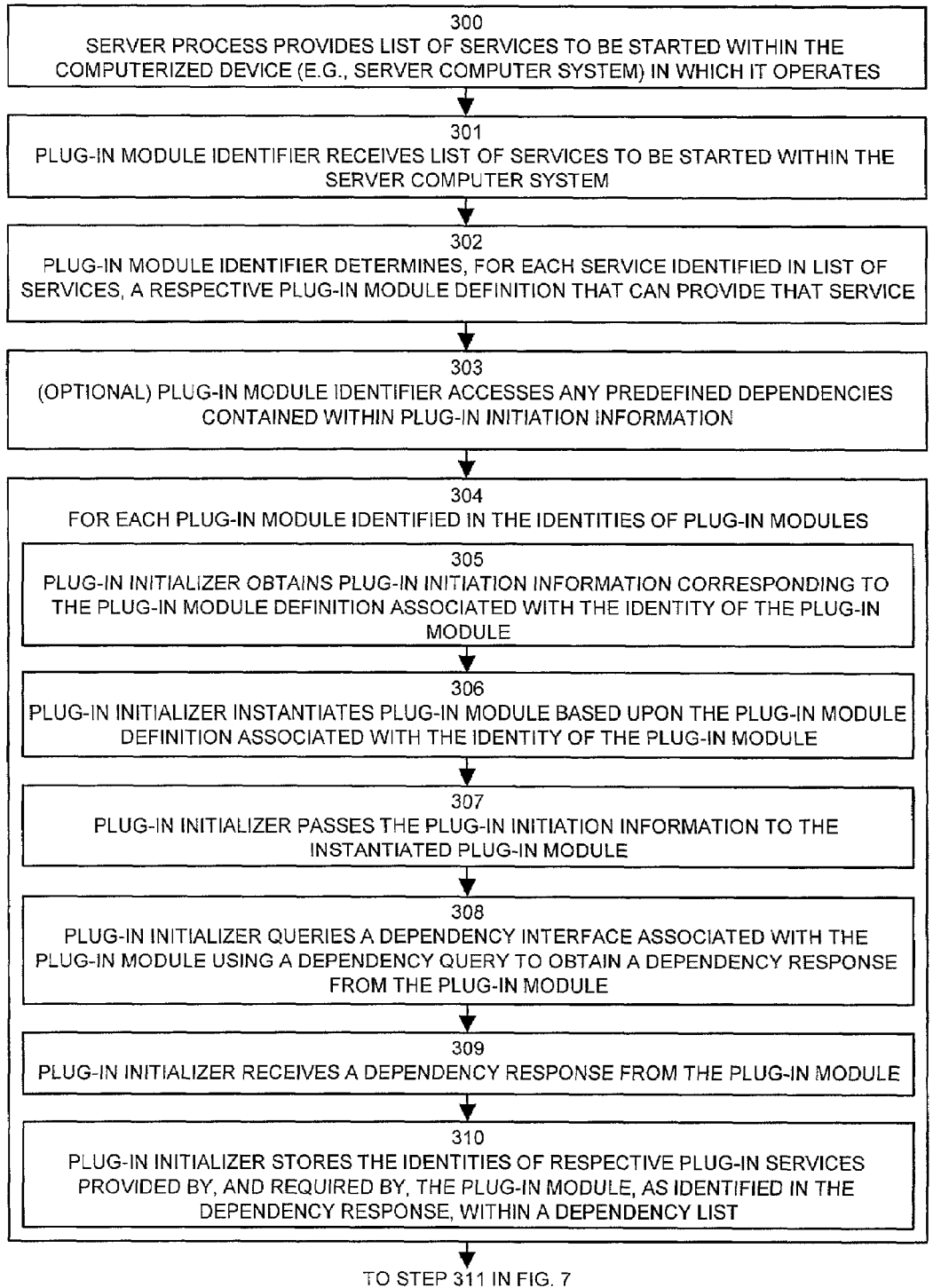
FIGS. 6 and 7 provide a flow chart of processing steps that illustrate an example operation of the computer system configured in accordance with one embodiment of the invention.
Figure 7:
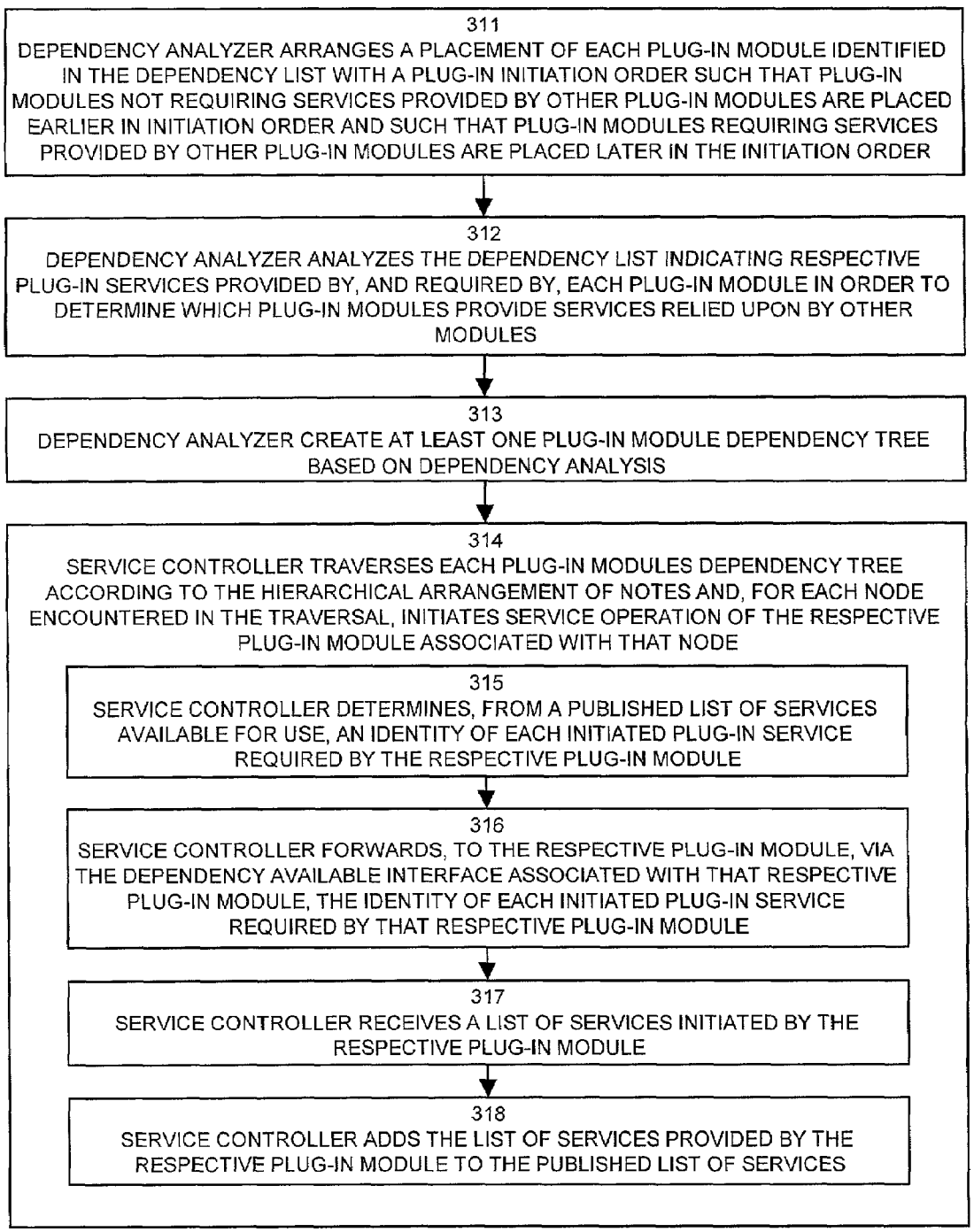

FIGS. 6 and 7 provide a flow chart of processing steps that illustrates the operation and interaction between the plug-in manager process 150, the server process 145 and one or more plug-in modules 160 according to one example embodiment of the invention. The processing steps shown in FIGS. 6 and 7 are meant to be one example of how a plug-in manager process 150 configured according to embodiments of the invention can operate to manage plug-in services. It is to be understood that variations to the order and inclusiveness of the processing steps is possible while still achieving the effects provided by embodiments of the invention to manage plug-in services in a computing system environment such as that illustrated in FIGS. 1 and 5. In addition, it is to be understood that the architecture of the plug-in manager process 150 illustrated in FIG. 5 is shown by way of example only to convey the various functional operations that a plug-in manager process 150 configured according to embodiments of the invention can perform.

In step 300, the server process 145 provides a list of services 170 to be started within the computerized device in which it operates, which in this example is the server computer system 120. A shown in the example in FIG. 5, the list of services 170 identifies that the server process 145 requires the services "A," "B," "E," "H.1" and "G.1."

In step 301, the plug-in module identifier 151 (FIG. 5) operating within the plug-in manager process 150 receives the list of services 170 to be started within the server computer system 120. This may be done, for example, buy intercepting a service call or system call to an operating system performing within the server computer system 120.

Next, in step 302, in response to receiving a list of services 170, the plug-in module identifier 151 determines, for each service identified in list of services 170, a respective plug-in module definition 162 that can provide that service. To do so, the plug-in module identifier 151 accesses the plug-in database 155 to obtain a plug-in module definition 162 for each of the identified services contained within the list of services 170. In the illustrated example of FIG. 5, the plug-in module identifier 151 obtains plug-in module definitions 162-1 (for service "A"), 162-2 (for service "B"), 162-5 (for service "E"), 162-7 (for service "G.1") and 162-8 (for service "H.1") based on the names of the services requested in the list of services 170.

In step 303, which is an optional step, the plug-in module identifier 151 accesses any predefined or pre-known dependencies 168 contained within the plug-in initiation information 164. Predefined dependencies information 168 can indicate other plug-in modules 160 not specified in the list of services 170 that will be required to operate the plug-in modules 160 that provide the services specified in the list of services 170. In other words, the server process 145 may provide a list of services 170 for certain plug-in modules but may be unaware of other plug-in modules 160 which will services may require to operate. The predefined dependency information 168 can indicate any other plug-in modules 160 which are required to operate the plug-in modules 160 identified with respective services listed in the list of services 170 (but which are unknown to the server process 145). Once the plug-in module identifier 151 has determined all plug-in module definitions that will be required to operate, the plug-in module identifier places the identity of each plug-in module definition into a set of identities of plug-in modules 191 and passes the set of identities of plug-in modules 191 to the plug-in initializer 152.

In an alternative configuration, the plug-in module identifier 151 can simply pass a set of identities of plug-in modules 191 that identify only those plug-in modules 160 listed in the list of services 170. Thereafter, in a process which will be explained shortly, the plug-in initializer 152 can initiate and query that set of plug-in modules 160 in order to determine any other plug-in modules which may be required for services. Thereafter, the plug-in initializer 152 can then access those additional plug-in module definitions 162 for those additional plug-in modules 160 and can initialize and query those plug-in is as well. This process may be repeated until all plug-in modules 160 have been initiated and queries such that there are no remaining required but uninitiated plug-in modules.

Generally, the plug-in initializer 152 is responsible for retrieving or deriving a plug-in dependency list 192 indicating respective plug-in services provided by, and required by, each plug-in module 160 identified in the identities of plug-in modules 191 (i.e., Step 203 in FIG. 2).

To do so in this example embodiment, in step 304, the plug-in initializer 152 enters a loop that is performed for each plug-in module 160 identified in the identities of plug-in modules 191 (as received from the plug-in module identifier 151).

In step 305 within the loop defined by step 304, the plug-in initializer 152 obtains plug-in initiation information 164 corresponding to the plug-in module definition 162 associated with the identity of the plug-in module 160 which is being processed in this iteration of the loop defined by step 304. The plug-in initiation information 164 can include, for example, previously saved plug-in state information produced as a result of a former operation of the plug-in module 160. In addition, plug-in initiation information 164 can include any properties, parameters or other signaling information that must be provided to a particular plug-in module 160 when that plug-in module is called by the plug-in manager process 150 for operation (e.g., execution, interpretation or performance). Since the plug-in initiation information 164 can include previously saved state information 164, this allows a plug-in module 160 to begin operation at an execution point at which it left off during a former operation. In other words, if a plug-in module 160 saves state information when it exits or terminate operations, it may use this state information to continue or resume processing where left off since the plug-in manager of embodiment of this invention is able to save this state and is able to return it to the plug-in module 160 upon its next operation.

Next, in step 306, the plug-in initializer 152 instantiates the plug-in module 160 based upon the plug-in module definition 162 associated with the identity of the plug-in module being processed in this iteration of the loop defined by step 304. The plug-in module definition 162 may be, for example, a Java class which the plug-in initializer 152 instantiates within the memory 122 in the server computer system 120.

In step 307, the plug-in initializer 152 passes the plug-in initiation information 164 to the instantiated plug-in module 160. In this manner, the plug-in module 160 receives any required parameters, control commands, signaling information or plug-in state information in order to properly operate in an enabled state within the server computer system 120. At this point, according to this embodiment of the invention, the plug-in module 160 operates in an "enabled state" and is not yet providing a service 147.

In step 308, the plug-in initializer 152 queries a dependency interface associated with the plug-in module 160 using a dependency query 171 to obtain a dependency response 173 from the plug-in module 160. In the example of plug-in module architecture illustrated in FIG. 4, the dependency interface is the service interfaces 161 for each respective plug-in service that the plug-in module 160 provides, as well as the list of required services 162 that the plug-in module 160 requires to properly operate. In other words, in step 308, the plug-in initializer 152 accesses the service interfaces 161 and required services 162 within the plug-in module 160 to determine which services are provided by, and required by, the plug-in module 160.

Next, in step 309, the plug-in module receives a dependency response 173 from the plug-in module 160. The dependency response 173 indicates respective plug-in services provided by, and required by, the plug-in module 160.

In step 310, the plug-in initializer 152 stores the identities of respective plug-in services provided by, and required by, the plug-in module 160, as identified in the dependency response 173, within a dependency list 192.

After all iterations of steps 305 through 310 are complete, the plug-in initializer 152 has instantiated a respective plug-in module 160 associated with each service that is to operate within the server computer system 120. In addition, the plug-in initializer 152 has queried each plug-in module 160 to retrieve, develop or compile a complete dependency list 192 of all services required and provided by those plug-in modules 160. Thereafter, the plug-in initializer 152 passes the dependency list 192 to the dependency analyzer 153.

Generally, the dependency analyzer 153 calculates a plug-in initiation order 190 based on the dependency list 192 (step 204 in FIG. 2).

To do so, in step 311, the dependency analyzer 153 arranges a placement of each plug-in module 160 identified in the dependency list 192 within a plug-in initiation order 190 such that plug-in modules 160 not requiring services provided by other plug-in modules 160 are placed earlier in the initiation order 190, and such that plug-in modules 160 requiring services provided by other plug-in modules are placed later in the initiation order 190. In the example embodiment in FIG. 5, the initiation order 190 is a plug-in module dependency tree which will be explained shortly. Generally, the plug-in module dependency tree 190 identifies or conveys a start or initiation order for all plug-in modules 160 identified by the plug-in module identifier 151.

In step 312, the dependency analyzer 153 analyzes the dependency list 192 indicating respective plug-in services provided by, and required by, each plug-in module 160 in order to determine which plug-in modules 160 provide services relied upon by other modules. In other words, in step 312, the dependency analyzer 153 determines a start order in which plug-in modules 160 can be transitioned from an enabled state into a service operation or started state such that when a particular plug-in module 160 enters its respective service operation state, all services 147 required by that plug-in module 160 (e.g., services provided by other plug-ins) will be available at that point in time.

Next, in step 313, the dependency analyzer 153 creates at least one plug-in module dependency tree 190 (i.e., the plug-in initiation order) based on the step of analyzing (step 312). The plug-in module dependency tree 190 contains a hierarchical arrangement of nodes associated with respective plug-in modules 160. The hierarchical arrangement indicates the plug-in initiation order of plug-in modules 160 respectively associated with the nodes in the dependency tree 190.

Figure 8:
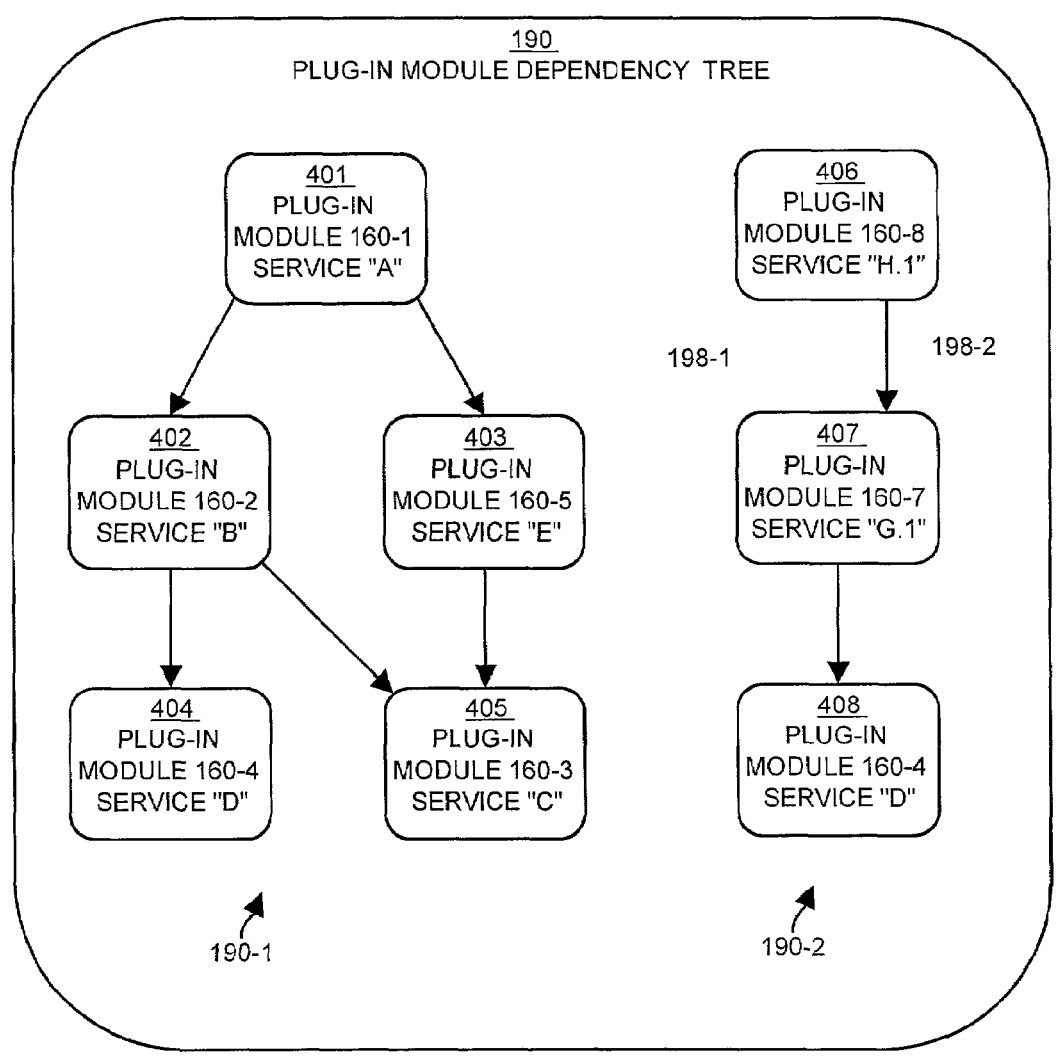
FIG. 8 illustrates an example of a plug-in initiation order in the form of a plug-in module dependency tree.

FIG. 8 illustrates an example of a set of plug-in module dependency trees 190-1 and 190-2 that contain plug-in module dependencies for the set of plug-in modules 160 illustrated in FIG. 5. Each node in a plug-in module dependency tree 190 represents a particular plug-in service and the lower a node is in the tree hierarchy, the sooner or earlier the service associated with that node is to be initiated in relation to other services represented by other nodes in the plug-in module dependency tree 190. In other words, the plug-in manager 150 can traverse a plug-in module tree 190 to initiate plug-in modules 160 corresponding to the lowest nodes in the tree 190 first, before initiating service operation of plug-in modules 160 corresponding to upper layer nodes in the tree 190.

In particular, the plug-in module dependency tree 190-1 includes nodes 401 to 405 which each represent a respective service provided by a respective plug-in module 160. As illustrated, the root node 401 represents plug-in module 160-1 which provides service "A." As indicated in the plug-in modules 160 in FIG. 5, service "A" in plug-in module 160-1 requires or depends upon services "B" and "E." As such, the plug-in module dependency tree 190-1 contains child nodes 402 in 403 of node 401 which represent plug-in modules 160-2 and 160-5 for services "B" and "E" respectively. Since the nodes 402 and 403 exist below node 401 (i.e., are children of node 401, which is a parent node), the plug-in manager 150 should initiate the services "B" and "E" before service "A" associated with node 401. Likewise, node 402 representing service "B" depends upon services "D" and "C", which are represented by nodes 404 and 405, respectively. Node 403 representing plug-in module service "E" requires or depends upon service "C" as represented by node 405 in the plug-in module dependency tree 190-1.

With respect to plug-in module dependency tree 190-2, the node 406 represents plug-in module 160-8 which provides plug-in service "H.1." This service "H.1" depends upon the service "G.1" of plug-in module 160-7 represented by node 407 in a tree 190-2. In addition, the service "G.1" represented by node 407 requires or depends upon the service "H.1" represented by node 406. As such, a service interdependency exists in the plug-in module dependency tree 190-2 which is represented by two dependency arrows 198-1 and 198-2 extending between the nodes 406 and 407. Also as indicated in the plug-in module dependency tree 190-2, the service "G.1" further depends upon the operation of the service "D" provided by plug-in module 160-4 as represented by node 408 in the plug-in module dependency tree 190-2.

Returning attention now to the flow chart of processing steps in FIG. 7, in step 314, the service controller 154 traverses (e.g., via a bottom-up traversal) each plug-in module dependency tree 190 according to the hierarchical arrangement of nodes and, for each node encountered in the traversal, initiates service operation of the respective plug-in module 160 associated with that node.

Specifically, in step 315, the service controller 154 determines, from a published list of services 180 available for initiated plug-in modules 160, an identity of each initiated plug-in service 147 (or 162-5 for example in FIG. 5) required by the respective plug-in module 160 being processed in this iteration of the tree traversal defined by step 314. In other words, in step 315, service controller 154 determines the identity of each service 147 required by the plug-in module 160 which is about to enter the service operation state.

Next, in step 316, the service controller 154 forwards, to the respective plug-in module 160 (being processed at this point in the traversal of the dependency tree 190), via the dependency available interface 163 associated with that respective plug-in module 160, the identity of each initiated plug-in service required by that respective plug-in module 160. In other words, in step 316, the service controller 154 provides the identities of the required plug-in services to the plug-in module so that the plug-in module 160 can reference those required services during service operation.

When the plug-in module 160 receives the identities of the required services via the dependency available interface 163, the plug-in module 160 transitions to the started or service providing state and provides back to the plug-in manager 150 a list of services 174 (FIGS. 1 and 5) initiated within that plug-in module 160. In other words, when a plug-in module 160 enters the started state it returns, back to the plug-in manager 150, a list 174 of the services 147 which that plug-in module 160 is now providing for use by applications such as the server process 145.

Accordingly, in step 317, the service controller 154 receives a list of services 174 initiated by the respective plug-in module 160.

Next, the service controller 154 adds the list of services 193 provided by the respective plug-in module 160 to the published list of services 180. In this manner, the service controller 154 maintains or updates the current published list of services with any newly available services 147 which are now offered by the plug-in module 160 which recently begin operation in a service providing state.

This process defined by the traversal of the plug-in module dependency tree(s) 190 (the tree traversal processing of step 314) continues until all plug-in modules 160 are initiated into a started state in the order defined by the plug-in module dependency tree 190. In this manner, services of plug-in modules are 160 started in a proper order to avoid dependency conflict or deadlock situations in which one plug-in module 160 depends upon services 147 of another which is not yet started.

As noted above, if two plug-in modules happened to depend upon each other, each may be started at approximately the same time in which case the service controller 154 can initiate the wait state operation 165 within one or more of the service interdependent plug-in modules 160 in order to allow those plug-in modules to intercommunicate with each other to agree on a proper service providing sequence.

Those skilled in the art will understand that there can be many other variations made to the operations of the embodiments explained above while still achieving the same objectives of the invention. Such variations are intended to be covered by the scope of this invention.

As an example, the plug-in manager process 150 can operate in a multi-threaded mode in which a processing thread is provided for each plug-in 160 that is determined to be required. In such an embodiment, once the plug-in manager 150 obtains the identities of plug-in modules for services required, the plug-in manager process 150 can start a processing thread for each plug-in (e.g., one thread per plug-in, or one thread for a sub-set of plug-ins). The processing thread for each plug-in(s) can then query the plug-in(s) to determine what services are required by (if any), and provided by the plug-in(s) associated with that thread.

If the thread for a plug-in determines that no services are required by that plug-in, then that thread of the plug-in manager process can initiate service operation of its respective plug-in at that point in time. Once initiated, the plug-in or its thread can then add the service(s) now available from that plug-in to a list of available plug-in services. Other threads that are operating on behalf of other plug-ins can periodically query the list of available plug-in services in order to determine when services become available that their respective plug-ins require. When a thread for a plug-in detects that all services are available that that thread's plug-in requires, that thread can initiate service operation of it's respective plug-in and the plug-in or the thread can then also add the service(s) now available from that plug-in to the list of available services, such that the list of services grows as plug-ins are initiated in this multi-threaded manner.

Each thread thus initiates service operation of its respective plug-in(s) in an independent manner, without a requirement to develop a dependency tree. In this embodiment, the "plug-in initiation order" is thus a collective determination made by all operating threads as to when to launch the service(s) provided by the plug-in(s) associated with each thread. Thus, with respect to the flow chart in FIG. 2, the step of retrieving the dependency list (step 203) is done for each plug-in by its respective thread within the plug-in manager process, whereas the step of calculating a plug-in initiation order is done by the collective operation of all threads (i.e., each thread contributing to the calculation by determining when its respective plug-in(s) can start based on other services that may or may not be required by that plug-in(s)).

The foregoing description of embodiments of the invention are not intended to be limiting. Rather, any limitations to embodiments of the invention are presented in the following claims.

What is claimed is:

1. A method for managing services associated with a plurality of plug-in modules, the method comprising the steps of:
   obtaining identities of a plurality of plug-in modules;
   based on queries to the plurality of plug-in modules, retrieving dependency list information indicating respective plug-in services provided by, and required by, the plurality of plug-in modules;
   wherein retrieving the dependency list information includes:
     initiating a query to a first plug-in module of the plurality of plug-in modules;
     in response to the query to the first plug-in module, receiving dependency information from the first plug-in module indicating that the first plug-in module requires a service provided by a second plug-in module;
     initiating a query to the second plug-in module;
     in response to the query to the second plug-in module, receiving dependency information from the second plug-in module;
   calculating a plug-in initiation order based upon the received dependency information;
   wherein calculating the plug-in initiation order includes:
     producing the plug-in initiation order based on the dependency information received from the first plug-in module and the dependency information received from the second plug-in module; and
   initiating service operation of plug-in modules according to the plug-in initiation order, such that if the first plug-in module provides a service required by the second plug-in module, the first plug-in module is initiated such that the service provided by the first plug-in module is available to the second plug-in module when required by the second plug-in module.

2. The method of claim 1, wherein the step of obtaining identities of a plurality of plug-in modules includes the steps of:
   receiving a list of services to be started within the computer system;
   determining, for each service in the list of services, a respective plug-in module definition that can provide that service; and
   placing the identity of each plug-in module definition determined in the step of determining into the identities of the plurality of plug-in modules.

3. The method of claim 1, wherein the step of retrieving the dependency list information includes:
   for each plug-in module identified in the identities of a plurality of plug-in modules, performing the steps of:
     instantiating the plug-in module based upon a plug-in module definition associated with the identity of the plug-in module;

receiving a dependency response from the plug-in module, the dependency response indicating respective plug-in services provided by, and required by, the plug-in module; and storing identities of the respective plug-in services provided by, and required by, the plug-in module as identified in the dependency response.

4. The method of claim 3, wherein the step of instantiating the plug-in module comprises the steps of:

obtaining plug-in initiation information corresponding to the plug-in module definition associated with the identity of the plug-in module;

instantiating the plug-in module based upon a plug-in module definition associated with the identity of the plug-in module; and passing the plug-in initiation information to the plug-in module for use by the plug-in module.

5. The method of claim 3, wherein the step of instantiating the plug-in module comprises the step of:

querying a dependency interface associated with the plug-in module with a dependency query to obtain the dependency response from the plug-in module.

6. The method of claim 1, wherein the step of calculating a plug-in initiation order based upon the dependency information comprises the step of:

arranging a placement of each plug-in module identified in the dependency list information within the plug-in initiation order such that plug-in modules not requiring services provided by other plug-in modules are placed earlier in the initiation order and such that plug-in modules requiring services provided by other plug-in modules are placed later in the initiation order.

7. The method of claim 6, wherein the step of arranging placement of each plug-in module identified in the dependency list information within the plug-in initiation order comprises the steps of:

analyzing the dependency list information indicating respective plug-in services provided by, and required by, each plug-in module to determine which plug-ins provide services relied upon by other plug-in modules; and creating, as the plug-in initiation order, at least one plug-in module dependency tree based on the step of analyzing, the at least one plug-in module dependency tree containing a hierarchical arrangement of nodes associated with respective plug-in modules, the hierarchical arrangement indicating the plug-in initiation order of the plug-in modules respectively associated with the nodes in the dependency tree.

8. The method of claim 7, wherein initiating service operation of plug-in modules according to the plug-in initiation order comprises:

traversing the at least one plug-in module dependency tree according to the hierarchical arrangement of nodes and for each node encountered during the step of traversing, initiating service operation of the respective plug-in module associated with that node.

9. The method of claim 8, wherein the step of initiating service operation of plug-in modules includes:

forwarding, via a dependency available interface associated with a respective plug-in module, a list of initiated plug-in services of other plug-in modules that are currently available for use by the respective plug-in module.

10. The method of claim 1, wherein the step of initiating service operation of plug-in modules according to the plug-in initiation order comprises performing, for each respective plug-in module in the plug-in initiation order, the steps of:

determining, from a published list of services available by initiated plug-in modules, an identity of each initiated plug-in service required by the respective plug-in module;

forwarding to the respective plug-in module, via a dependency available interface associated with the respective plug-in module, the identity of each initiated plug-in service required by the respective plug-in module;

receiving a list of services initiated by the respective plug-in module; and adding the list of services provided by the respective plug-in module to the published list of services.

11. The method of claim 1, wherein the step of initiating service operation of plug-in modules according to the plug-in initiation order operates such that if the second plug-in module requires a service provided by the first plug-in module, the second plug-in module is initiated such that the service provided by the first plug-in module is available to the second plug-in module when required.

12. The method of claim 1, wherein the first plug-in module is initiated via the step of initiating service operation of plug-in modules prior to initiation of the second plug-in module.

13. The method of claim 1, wherein the first plug-in module is initiated via the step of initiating operation of plug-in modules after initiation of the second plug-in module, and wherein the second plug-in module includes a wait-state operation causing the second plug-in module to wait to provide the service offered by the second plug-in module until initiation of the first plug-in module.

14. The method of claim 1, wherein the steps of obtaining, retrieving, calculating and initiating are performed by a multi-threaded plug-in manager and wherein the step of calculating a plug-in initiation order is performed by collectively operating a respective thread for each plug-in, each thread performing the step of initiating service operation of at least one plug-in module when all services required by that plug-in module are available.

15. The method as in claim 1, wherein initiating service operation of the plug-in modules includes initiating at least partial concurrent execution of the first plug-in module and the second plug-in module.

16. The method as in claim 15, wherein the second plug-in module depends on a given service provided by the first plug-in module.

17. The method as in claim 16, wherein initiating service operation of the plug-in modules enables communication between the first plug-in module and the second plug-in module to enable each other to indicate when the given service is available.

18. The method as in claim 17, wherein during the at least partial concurrent execution, the first plug-in module initiates a wait state and notifies the second plug-in module that the first plug-in module is available for service processing.

19. The method as in claim 17, wherein during the at least partial concurrent execution, the first plug-in module initiates a wait state and notifies the second plug-in module that the first plug-in module is waiting for the second plug-in module to provide a particular service.

20. The method as in claim 1 further comprising:

utilizing services of initiated plug-in modules for purposes of managing resources associated with a respective storage area network.

21. The method as in claim 1 further comprising:

initiating a query to the second plug-in module; and in response to the query to the second plug-in module, receiving dependency information from the second plug-in module indicating that the second plug-in module does not require services of any other plug-in modules.

22. A computer system comprising:
a memory;
a processor; and
an interconnection mechanism coupling the memory and the processor,
wherein the memory is encoded with a plug-in manager application that, when performed on the processor, produces a plug-in manager process that manages services associated with a plurality of plug-in modules encoded within the memory by performing the operation steps of:
obtaining identities of a plurality of plug-in modules including a first plug-in module and a second plug-in module;
initiating a query to the first plug-in module of the plurality of plug-in modules;
in response to the query to the first plug-in module receiving dependency information from the first plug-in module indicating that the first plug-in module requires a service provided by the second plug-in module;
initiating a query to the second plug-in module;
in response to the query to the second plug-in module, receiving dependency information from the second plug-in module
producing a plug-in initiation order based on the dependency information received from the first plug-in module and the dependency information received from the second plug-in module;
initiating service operation of plug-in modules on the processor according to the plug-in initiation order, such that if a first plug-in module provides a service required by a second plug-in module, the first plug-in module is initiated such that the service provided by the first plug-in module is available to the second plug-in module when required by the second plug-in module.

23. The computer system of claim 22, wherein when the plug-in manager process performs the step of obtaining identities of the plurality of plug-in modules, the plug-in manager process performs steps of:
receiving a list of services to be started within the computer system;
determining, for each service in the list of services, a respective plug-in module definition that can provide that service; and
placing the identity of each plug-in module definition determined in the step of determining into the identities of the plurality of plug-in modules.

24. The computer system of claim 22, wherein when the plug-in manager process performs a step of retrieving a dependency list information indicating respective plug-in services provided by, and required by, each plug-in module, the plug-in manager process performs the steps of:
for each plug-in module identified in the identities of a plurality of plug-in modules, performing the steps of:
instantiating the plug-in module in the memory based upon a plug-in module definition associated with the identity of the plug-in module;
receiving a dependency response from the plug-in module, the dependency response indicating respective plug-in services provided by, and required by, the plug-in module; and
storing, in the memory, identities of the respective plug-in services provided by, and required by, the plug-in module as identified in the dependency response.

25. The computer system of claim 24, wherein when the plug-in manager process performs the step of instantiating the plug-in module, the plug-in manager process performs the steps of:
obtaining, in the memory, plug-in initiation information corresponding to the plug-in module definition associated with the identity of the plug-in module;
instantiating the plug-in module in the memory based upon a plug-in module definition associated with the identity of the plug-in module; and
passing the plug-in initiation information to the plug-in module in the memory for use by the plug-in module.

26. The computer system of claim 24, wherein when the plug-in manager process performs the step of instantiating the plug-in module, the plug-in manager process performs the step of:
querying a dependency interface associated with the plug-in module with a dependency query to obtain the dependency response from the plug-in module.

27. The computer system of claim 22, wherein when the plug-in manager process performs a step of producing the plug-in initiation order based upon the dependency information, the plug-in manager process performs the step of:
arranging a placement of each plug-in module identified in a dependency list within the plug-in initiation order such that plug-in modules not requiring services provided by other plug-in modules are placed earlier in the initiation order and such that plug-in modules requiring services provided by other plug-in modules are placed later in the initiation order.

28. The computer system of claim 27, wherein when the plug-in manager process performs the step of arranging placement of each plug-in module identified in the dependency list within the plug-in initiation order, the plug-in manager process performs the steps of;
analyzing the dependency list indicating respective plug-in services provided by, and required by, each plug-in module to determine which plug-ins provide services relied upon by other plug-in modules; and
creating in the memory, as the plug-in initiation order, at least one plug-in module dependency tree based on the step of analyzing, the at least one plug-in module dependency tree containing a hierarchical arrangement of nodes associated with respective plug-in modules, the hierarchical arrangement indicating the plug-in initiation order of the plug-in modules respectively associated with the nodes in the dependency tree.

29. The computer system of claim 28, wherein when the plug-in manager process performs the step of initiating service operation of plug-in modules according to the plug-in initiation order, the plug-in manager process performs the step of:
traversing the at least one plug-in module dependency tree in the memory according to the hierarchical arrangement of nodes and for each node encountered during the step of traversing, initiating service operation of the respective plug-in module associated with that node.

30. The computer system of claim 29, wherein when the plug-in manager process performs the step of initiating service operation of the respective plug-in module associated with that node, the plug-in manager process performs the step of:

forwarding, via a dependency available interface associated with the respective plug-in module, a list of initiated plug-in services of other plug-in modules that are currently available for use by the respective plug-in module.

31. The computer system of claim 22, wherein when the plug-in manager process performs the step of initiating service operation of plug-in modules according to the plug-in initiation order the plug-in manager process performs, for each respective plug-in module in the plug-in initiation order, the steps of:
determining, from a published list of services available by initiated plug-in modules, an identity of each initiated plug-in service required by the respective plug-in module;
forwarding to the respective plug-in module, via a dependency available interface associated with the respective plug-in module, the identity of each initiated plug-in service required by the respective plug-in module;
receiving a list of services initiated by the respective plug-in module; and
adding the list services provided by the respective plug-in module to the published list of services.

32. The computer system of claim 22, wherein the step of initiating service operation of plug-in modules according to the plug-in initiation order operates in the plug-in manager process such that if the second plug-in module requires a service provided by the first plug-in module, the second plug-in module is initiated such that the service provided by the first plug-in module is available to the second plug-in module when required.

33. The computer system of claim 22, wherein the plug-in manager initiates the first plug-in module via the step of initiating service operation of plug-in modules prior to initiation of the second plug-in module.

34. The computer system of claim 22, wherein the plug-in manager process initiates the first plug-in module via the step of initiating operation of plug-in modules after initiation of the second plug-in module, and wherein the second plug-in module includes a wait-state operation causing the second plug-in module to wait to provide the service offered by the second plug-in module until initiation of the first plug-in module.

35. The computer system of claim 22, wherein the steps of obtaining, receiving, producing, and initiating are performed by a multi-threaded plug-in manager and wherein the step of calculating a plug-in initiation order is performed by collectively operating a respective thread for each plug-in, each thread performing the step of initiating service operation of at least one plug-in module when all services required by that plug-in module are available.

36. The computer system as in claim 22,
wherein the dependency information received from the second plug-in module indicates that a third plug-in module is required by the second plug-in module.

37. The computer system as in claim 22 further supporting operations of:
based on contents of the dependency information received from the second plug-in module, identifying that the second plug-in module requires a service provided by a third plug-in module; and
initiating a query to the third plug-in module; and
in response to the query to the third plug-in module, receiving a dependency listing from the third plug-in module indicating that the third plug-in module does not require services of any other plug-in modules; and wherein producing the plug-in initiation order includes producing the plug-in initiation order based on the dependency information received from the first plug-in module, the dependency information received from the second plug-in module, and the dependency listing received from the third plug-in module.

38. A computer program product having a computer-readable medium including computer program logic encoded thereon, that when executed on a computer system having a coupling of a memory and a processor, provides a plug-in manager process for managing plug-in services by causing the processor to perform the operations of:
obtaining identities of a plurality of plug-in modules including a first plug-in module and a second plug-in module;
initiating a query to the first plug-in module of the plurality of plug-in modules;
in response to the query to the first plug-in module, receiving dependency information from the first plug-in module indicating that the first plug-in module requires a service provided by the second plug-in module;
initiating a query to the second plug-in module;
in response to the query to the second plug-in module, receiving dependency information from the second plug-in module;
producing a plug-in initiation order based on the dependency information received from the first plug-in module and the dependency information received from the second plug-in module; and
initiating service operation of plug-in modules on the processor according to the plug-in initiation order, such that if a first plug-in module provides a service required by a second plug-in module, the first plug-in module is initiated such that the service provided by the first plug-in module is available to the second plug-in module when required by the second plug-in module.

39. The computer program product as in claim 38, wherein the processor further performs operations of:
determining a list of plug-in services required by a software application; and
querying a set of plug-in modules to identify services provided by the set of plug-in modules.

40. The computer program product as in claim 39, wherein the processor further performs operations of:
in response to querying the set of plug-in modules, identifying plug-in modules not identified by the software application as being necessary but which are identified by the set of plug-in modules as being necessary to carry out execution of an operation on behalf of the software application.

41. The computer program product as in claim 40, wherein the processor further performs operations of:
initiating service operation of plug-in modules on the processor according to an order other than the plug-in initiation order, such that if a third plug-in module provides a service required by a fourth plug-in module, the third plug-in module being initiated after initiation of the fourth plug-in module, the third plug-in module initiating a wait state operation causing the third plug-in module to wait to provide the service offered by the third plug-in module until instantiation of the fourth plug-in module.

42. The computer program product as in claim 40, wherein the processor initiates execution of the first plug-in module before execution of the second plug-in module, the first plug-in module initiating a wait state operation resulting in signaling to the second plug-in module, the signaling indicating that a respective service of the first plug-in module is not yet available to the second plug-in module.

43. The computer program product as in claim 42, wherein the processor further performs operations of:
   maintaining a list of services for a set of plug-in modules currently able to provide respective services; and
   publishing the list of services for the software application to identify instantiated plug-ins currently providing the respective services.

44. The computer program product as in claim 38, wherein initiating service operation of the plug-in modules includes:
   initiating at least partial concurrent execution of the first plug-in module and the second plug-in module even though the second plug-in module requires the service provided by the first plug-in module.

45. The computer program product as in claim 38, wherein initiating service operation of the plug-in modules includes initiating execution of a first plug-in module that implements a wait state operation, the wait state operation causing the first plug-in module to signal to a dependent second plug-in module that a respective service is not available.

46. A computer system comprising:
   a memory;
   a processor; and
   an interconnection mechanism coupling the memory and the processor;
   wherein the memory is encoded with a plug-in manager application that, when performed on the processor, produces a plug-in manager process that manages services associated with a plurality of plug-in modules encoded within the memory by operating on the computer system and causing the computer system to provide:
      means for obtaining identities of a plurality of plug-in modules in the memory;
      means for initiating a query to a first plug-in module of the plurality of plug-in modules;
      means for receiving dependency information from the first plug-in module indicating that the first plug-in module requires a service provided by a second plug-in module in response to the query to the first plug-in module;
      means for initiating a query to the second plug-in module;
      means for receiving dependency information from the second plug-in module in response to the query to the second plug-in module;
      means for producing a plug-in initiation order based on the dependency information received from the first plug-in module and the dependency information received from the second plug-in module;
      means for initiating service operation of plug-in modules on the processor according to the plug-in initiation order, such that if a first plug-in module provides a service required by a second plug-in module, the first plug-in module is initiated such that the service provided by the first plug-in module is available to the second plug-in module when required by the second plug-in module; and
   wherein the first plug-in module is initiated via the step of initiating operation of plug-in modules after initiation of the second plug-in module, and wherein the second plug-in module includes a wait-state operation causing the second plug-in module to wait to provide the service offered by the second plug-in module until initiation of the first plug-in module.

\* \* \* \* \*